United States Patent
Kim et al.

(10) Patent No.: US 9,341,525 B2
(45) Date of Patent: May 17, 2016

(54) TORQUE TRANSDUCER, METHOD FOR MANUFACTURING TORQUE TRANSDUCER AND TRANSMISSION FOR VEHICLE USING TORQUE TRANSDUCER

(71) Applicant: Kyungpook National University Industry-Academic Cooperation Foundation, Daegu (KR)

(72) Inventors: Gi Woo Kim, Incheon (KR); Ji Sik Kim, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 0 days.

(21) Appl. No.: 14/337,284

(22) Filed: Jul. 22, 2014

(65) Prior Publication Data
US 2015/0020611 A1    Jan. 22, 2015

(30) Foreign Application Priority Data
Jul. 22, 2013  (KR) .......................... 10-2013-0086212

(51) Int. Cl.
*G01L 3/02* (2006.01)
*G01L 3/08* (2006.01)
*G01D 5/36* (2006.01)
*G01D 5/347* (2006.01)

(52) U.S. Cl.
CPC .............. *G01L 3/08* (2013.01); *G01D 5/34715* (2013.01); *G01D 5/36* (2013.01); *Y10T 29/49002* (2015.01)

(58) Field of Classification Search
CPC ........ G01D 5/34715; G01D 5/36; G01L 3/08; G01P 3/486

USPC ............................. 73/800, 862.191, 862.324
See application file for complete search history.

(56) References Cited

U.S. PATENT DOCUMENTS

| | | | |
|---|---|---|---|
| 5,646,356 A | | 7/1997 | Ling et al. |
| 5,983,720 A | * | 11/1999 | Crabb et al. ............... 73/514.26 |
| 6,246,049 B1 | * | 6/2001 | Wirthlin ....................... 250/229 |
| 6,359,409 B1 | * | 3/2002 | Siraky ........................... 318/560 |
| 6,948,381 B1 | * | 9/2005 | Discenzo .................. G01L 3/12 73/800 |
| 7,307,702 B1 | * | 12/2007 | Mathur ...................... G01L 1/24 356/32 |
| 7,730,602 B2 | * | 6/2010 | Shimizu .................. G01L 3/102 29/592.1 |
| 2008/0120045 A1 | * | 5/2008 | Hyodo ...................... G01L 1/24 702/42 |
| 2009/0012431 A1 | * | 1/2009 | Hyodo ................. A61B 5/4504 600/587 |
| 2013/0076290 A1 | * | 3/2013 | Yoshida ........................ 318/652 |
| 2014/0003905 A1 | * | 1/2014 | Delvaux ............... F01D 21/003 415/1 |

FOREIGN PATENT DOCUMENTS

| | | | |
|---|---|---|---|
| JP | 2600461 B2 | | 4/1997 |
| JP | 2001-174288 | * | 6/2001 |
| JP | 2002500753 A | | 1/2002 |
| JP | 3549539 B2 | | 8/2004 |
| KR | 100196802 B1 | | 6/1999 |
| KR | 1020070056850 | | 6/2007 |
| KR | 20090015509 A | | 2/2009 |
| WO | 9527191 A1 | | 10/1995 |

* cited by examiner

*Primary Examiner* — Max Noori
(74) *Attorney, Agent, or Firm* — Carter, DeLuca, Farrell & Schmidt, LLP

(57) ABSTRACT

Provided are a torque transducer, a method for manufacturing the torque transducer, and a transmission for a vehicle using the torque transducer. The torque transducer includes a mechano-luminescent (ML) part disposed on a torque measuring object and an illumination sensor disposed to be spaced apart from the ML part.

17 Claims, 5 Drawing Sheets

TORQUE TRANSDUCER, METHOD FOR MANUFACTURING TORQUE TRANSDUCER AND TRANSMISSION FOR VEHICLE USING TORQUE TRANSDUCER

CROSS-REFERENCE TO RELATED APPLICATIONS

This U.S. non-provisional patent application claims priority under 35 U.S.C. §119 of Korean Patent Application No. 10-2013-0086212, filed on Jul. 22, 2013, the entire contents of which are hereby incorporated by reference.

BACKGROUND OF THE INVENTION

The present invention disclosed herein relates to a torque transducer, a method for manufacturing the torque transducer, and a transmission for a vehicle using the torque transducer.

In recent years, studies with respect to electronic control systems using a torque transducer are being actively conducted. Torque transducers may be classified into fixing type torque transducers, contact type torque transducers, and non-contact type torque transducers. The fixing type and contact type torque transducers may measure the magnitude of torque by using a strain gauge. On the other hand, the non-contact type torque transducer may be spaced a predetermined distance from a rotation shaft to measure the magnitude of torque by using magnetic fields.

A method for measuring torque of a rotation shaft by using a strain gauge, a slip ring, and a wireless transceiver among the non-contact measuring methods may have a difficulty to be applied for measuring torque of an output shaft in a vehicle driveline. As a result, methods for estimating torque by using an observer or indirectly obtaining torque information by using only a speed single are being studied.

However, these methods may be unsuitable for being used in an extensive operation region due to large estimation or calculation error.

Methods using a magneto-elastic material that actively generates a variation in magnetic field due to a variation in torsion stress as other non-contact measuring methods are being studied. However, a torque transducer using these methods may be difficult to be commercialized because of a relatively high price than those of other sensors and relatively weak durability due to brittle property of the magneto-elastic material.

SUMMARY OF THE INVENTION

The present invention provides a torque transducer that has a relatively low error and is relatively inexpensive, a method for manufacturing the torque transducer, and a transmission for a vehicle using the torque transducer.

Embodiments of the present invention provide torque transducers including: a mechano-luminescent (ML) part disposed on a torque measuring object; and an illumination sensor disposed to be spaced apart from the ML part.

In some embodiments, the torque measuring object may include a driving shaft.

In other embodiments, the ML part may include at least one of: ML paint; and a tape coated with an ML material.

In still other embodiments, the ML paint may be applied on a circumference of the driving shaft.

In even other embodiments, the ML paint may be applied on the circumference of the driving shaft having a diameter of about 25 mm at a width of about 30 mm and a thickness of about 0.5.

In yet other embodiments, the tape coated with the ML material may be attached to a circumference of the driving shaft.

In further embodiments, the illumination sensor may be spaced a distance of about 2 mm from the ML part.

In still further embodiments, the torque transducers may further include an ultraviolet radiator for irradiating ultraviolet rays onto the ML part.

In even further embodiments, the torque transducers may further include a blackout part for blocking light incident into the ML part and the illumination sensor.

In yet further embodiments, the blackout part may include a housing that accommodates the ML part and the illumination sensor and be sealed.

In other embodiments of the present invention, methods for manufacturing a torque transducer include: disposing a mechano-luminescent (ML) part on a torque measuring object; and disposed an illumination sensor to be spaced apart from the ML part.

In some embodiments, the disposing of the ML part on the torque measuring object may include: applying ML paint on a circumference of a driving shaft; and drying the ML paint.

In other embodiments, the applying of the ML paint on the circumference of the driving shaft may include applying the ML paint on the circumference of the driving shaft having a diameter of about 25 mm at a width of about 30 mm and a thickness of about 0.5 mm.

In still other embodiments, the disposing of the ML part on the torque measuring object may include attaching a tape coated with an ML material on a circumference of a driving shaft.

In even other embodiments, the disposing of the illumination sensor may include disposing the illumination sensor to be spaced a distance of about 2 mm from the ML part.

In yet other embodiments, the methods may further include installing an ultraviolet radiator to irradiate ultraviolet rays onto the ML part.

In further embodiments, the methods may further include installing a blackout part to block light incident into the ML part and the illumination sensor.

In still further embodiments, the installing of the blackout part may include accommodating the ML part and the illumination sensor in a housing to seal the housing.

In still other embodiments of the present invention, transmissions for a vehicle include: a transmission shaft for transmitting a power of an engine; a mechano-luminescent (ML) part disposed on the transmission shaft; and an illumination sensor disposed to be spaced apart from the ML part.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

In the following description, the technical terms are used only for explaining a specific exemplary embodiment while not limiting the present invention. The terms of a singular form may include plural forms unless specifically mentioned. The meaning of 'comprises' and/or 'comprising' specifies a composition, a component, a constituent, a stop, an operation and/or an element does not exclude other compositions, components, constituents, steps, operations and/or elements. In the specification, 'and/or' means that it includes at least one of listed components.

Embodiments of the prevent invention provide a torque transducer that measures torque in a non-contact manner by using a mechano-luminescent (ML) material, a method for manufacturing the torque transducer, and a transmission for a vehicle using the torque transducer.

Hereinafter, exemplary embodiments will be described in detail with reference to the accompanying drawings.

Figure 1:
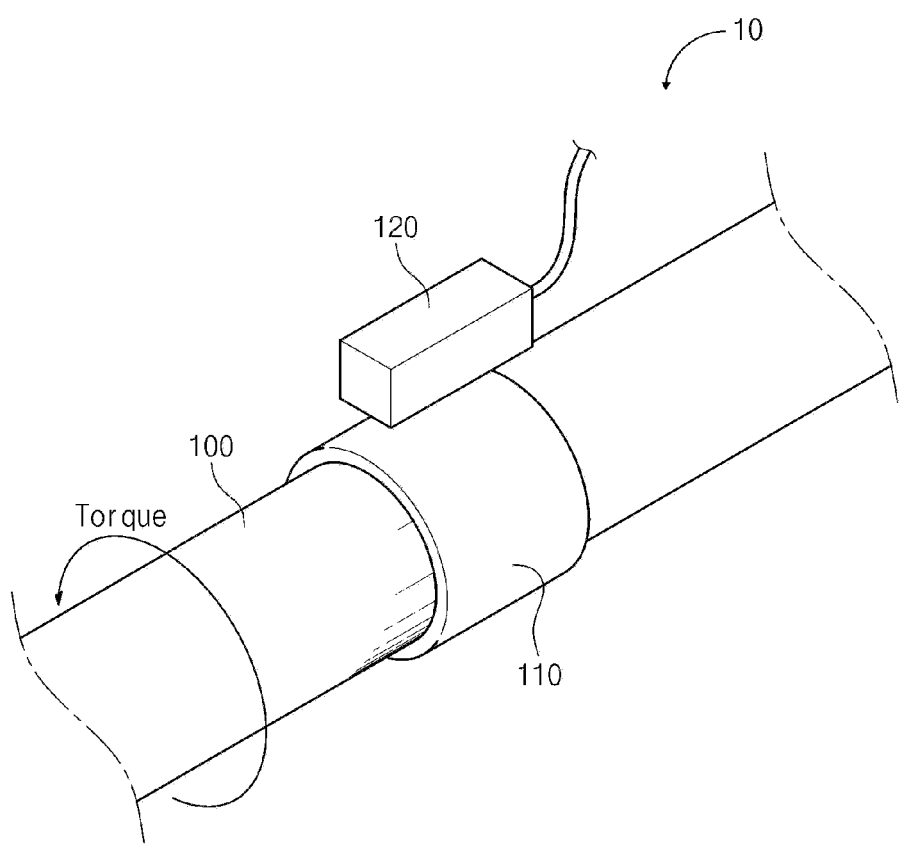
FIG. 1 is a perspective view of a torque transducer according to an embodiment of the present invention.
Figure 2:
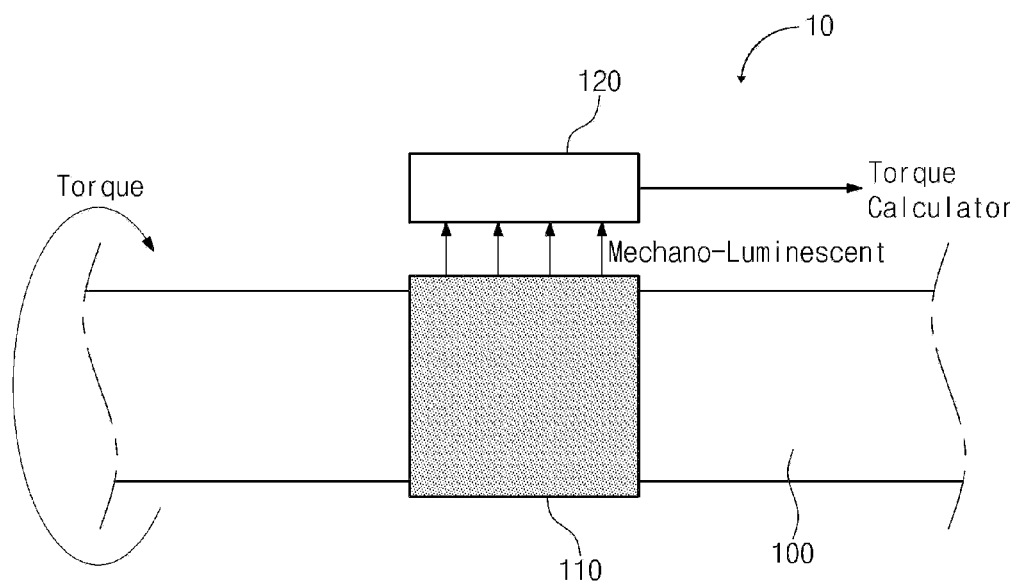
FIG. 2 is a side view of the torque transducer according to an embodiment of the present invention.

FIG. 1 is a perspective view of a torque transducer according to an embodiment of the present invention, and FIG. 2 is a side view of the torque transducer according to an embodiment of the present invention.

Referring to FIGS. 1 and 2, a torque transducer 10 may include an ML part 110 and an illumination sensor 120. The ML part 110 may be disposed on a torque measuring object 100. The illumination sensor 120 may be spaced apart from the ML part 110.

According to an embodiment, the torque measuring object 100 may include a driving shaft for transmitting a rotation power of a motor into an operation mechanism. For example, the torque measuring object 100 may include a transmission shaft provided in a transmission for a vehicle. However, the present invention is not limited thereto. For example, the torque measuring object 100 may include any rotation shaft of which torque is to be measured.

The ML part 110 may include a material that emits light when an external load or stress is applied thereto.

According to an embodiment, the ML part 110 may include ML paint.

According to the current embodiment, the ML paint may be applied to a circumference of the driving shaft 100. For example, the ML paint may be applied to the circumference of the driving shaft 100 having a diameter of about 25 mm at a width of about 30 mm and a thickness of about 0.5 mm.

According to another embodiment, the ML part 110 may include a tape having one surface that is coated with the ML material. According to the current embodiment, the tape coated with the ML material may be attached to the circumference of the driving shaft 100.

The illumination sensor 120 may detect the light emitted from the ML part 110.

As illustrated in FIGS. 1 and 2, the illumination sensor 120 may be spaced apart from the ML part 110. For example, the illumination sensor 120 may be spaced a distance of about 2 mm from the ML part 110. However, the present invention is not limited thereto.

In the torque transducer 10 according to an embodiment of the present invention, when torque is applied to the torque measuring object 100 to allow stress to act on the ML part 110, the illumination sensor 120 may detect the light emitted from the ML part 110, and then the detected ML intensity may be outputted as an electrical signal.

The ML intensity may be transmitted into a torque calculator (not shown), and then the torque calculator may calculate the intensity of the torque applied to the torque measuring object 100 on the basis of the received ML intensity.

Figure 3:
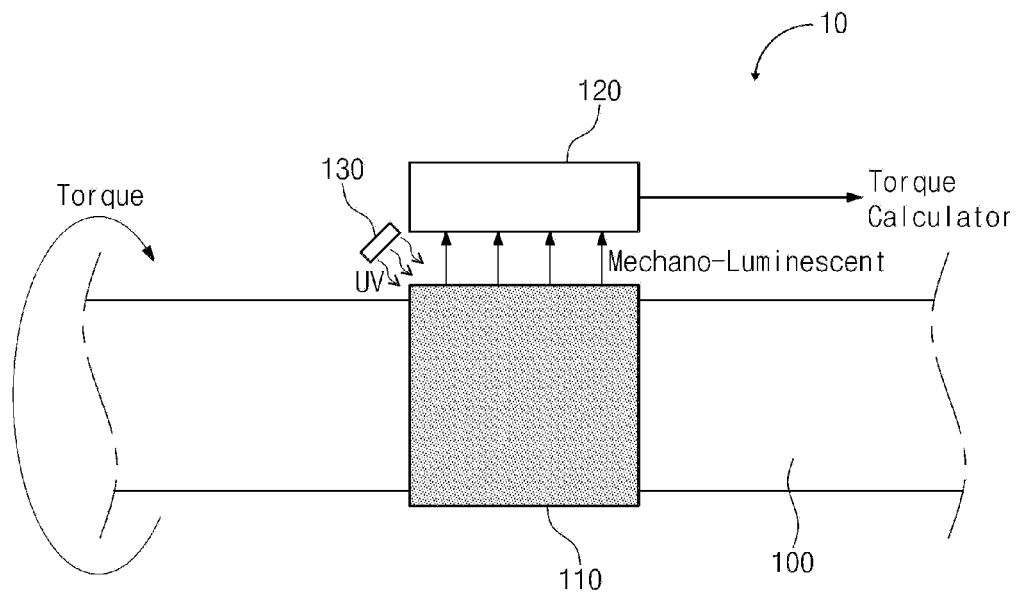
FIG. 3 is a side view of a torque transducer according to another embodiment of the present invention.

FIG. 3 is a side view of a torque transducer 10 according to another embodiment of the present invention.

Referring to FIG. 3, a torque transducer 10 may further include an ultraviolet radiator 130. The ultraviolet radiator 130 may irradiate ultraviolet rays onto the ML part 110.

The ML material may react to the torsion stress after exposed to the ultraviolet rays to emit ML. In this case, the torque transducer 10 may further include the ultraviolet radiator 130 for irradiating the ultraviolet rays onto the ML part 110 before torque is measured.

A position of the ultraviolet radiator 130 is not limited to that illustrated in FIG. 3. For example, the ultraviolet radiator 130 may be disposed at a certain position if the ultraviolet radiator 130 irradiates sufficient ultraviolet rays onto the ML part 110.

Also, although only one ultraviolet radiator 130 is illustrated in FIG. 3, the present invention is not limited to the number of ultraviolet radiator 130. For example, according to another embodiment, at least two ultraviolet radiators may be provided. In this case, to irradiate the ultraviolet rays onto the ML part 110 disposed along a circumference of the torque measuring object 100, a plurality of ultraviolet radiators may be disposed along the circumference of the torque measuring object 100.

Figure 4:
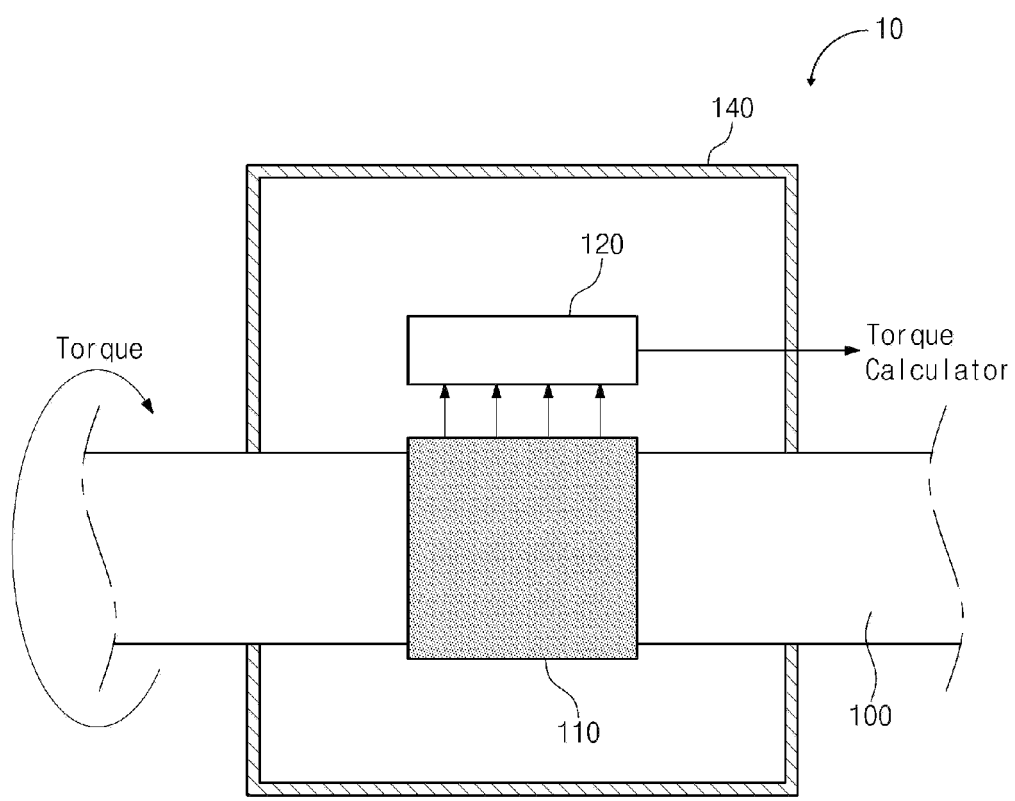
FIG. 4 is a side view of a torque transducer according to another embodiment of the present invention.

FIG. 4 is a side view of a torque transducer 10 according to another embodiment of the present invention.

Referring to FIG. 4, a torque transducer 10 may further include a blackout part 140. The blackout part 140 may block light incident into an ML part 110 and an illumination sensor 120.

For example, the blackout part 140 may include a housing that accommodates the ML part 110 and the illumination sensor 120 and is sealed.

If the torque transducer 10 further includes an ultraviolet radiator 130, the blackout part 140 may accommodate the ultraviolet radiator 130 in addition to the ML part 110 and the illumination sensor 120 to form a darkroom.

Figure 5:
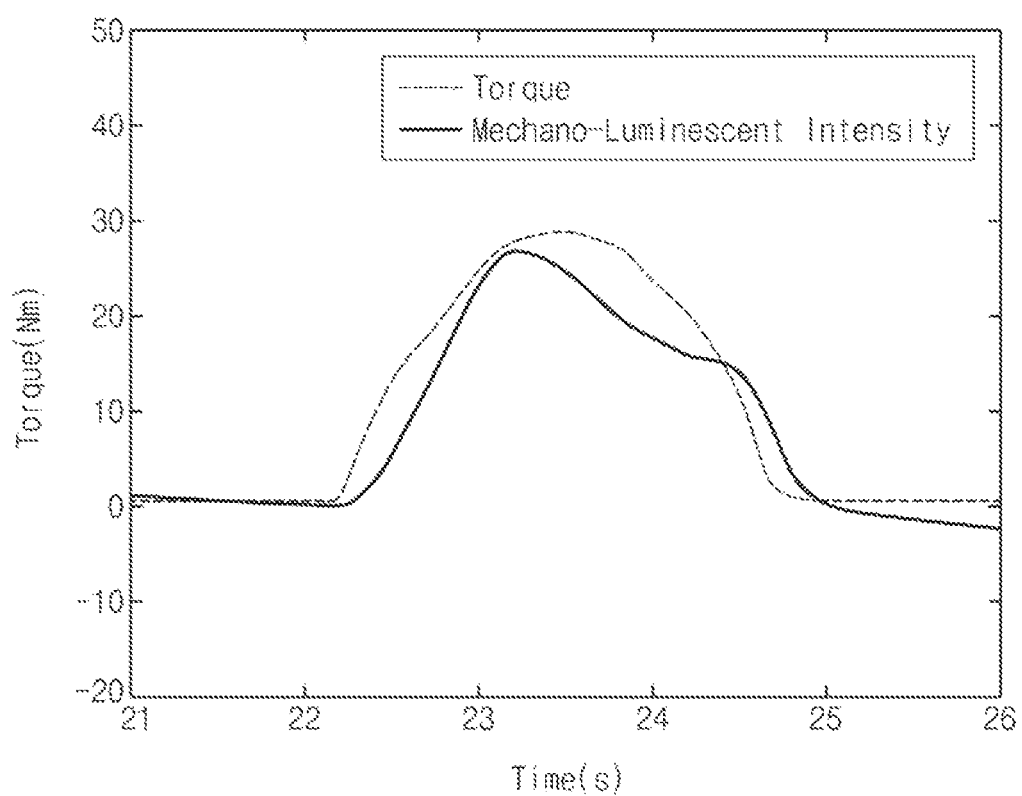
FIG. 5 is a graph illustrating experiment results obtained by using the torque transducer according to an embodiment of the present invention.

FIG. 5 is a graph illustrating experiment results obtained by using the torque transducer 10 according to an embodiment of the present invention.

To verify an operation and performance of the torque transducer 10, a servo-motor (about 3.5 KW) for controlling a rotation rate was used to operate a transmission shaft. Also, to correct and examine a torque signal, a high-performance torque sensor (HBM T20WN, about 50 Nm) was coaxially installed. To applying torsion torque to the transmission shaft, a powder brake operating by an electrical signal was installed on a side opposite to the transmission shaft to allow load torque to act on the transmission shaft. The test data was collected and analyzed through a data acquisition system (DAS) constituting by a data acquisition board (DAQ) and Labview®.

To maximally increase sensitivity in ML intensity, all lightings in a laboratory were turned off to form a darkroom. Also, ML paint applied on the transmission shaft was exposed to ultraviolet light for a predetermined time by using the ultraviolet radiator to perform an ML measuring test.

The load torque (a dotted line in FIG. 5) having a triangular shape and a maximum value of about 30 Nm acts on the transmission shaft by using the powder brake. Here, the measured ML intensity is expressed as a solid line in FIG. 5.

Figure 6:
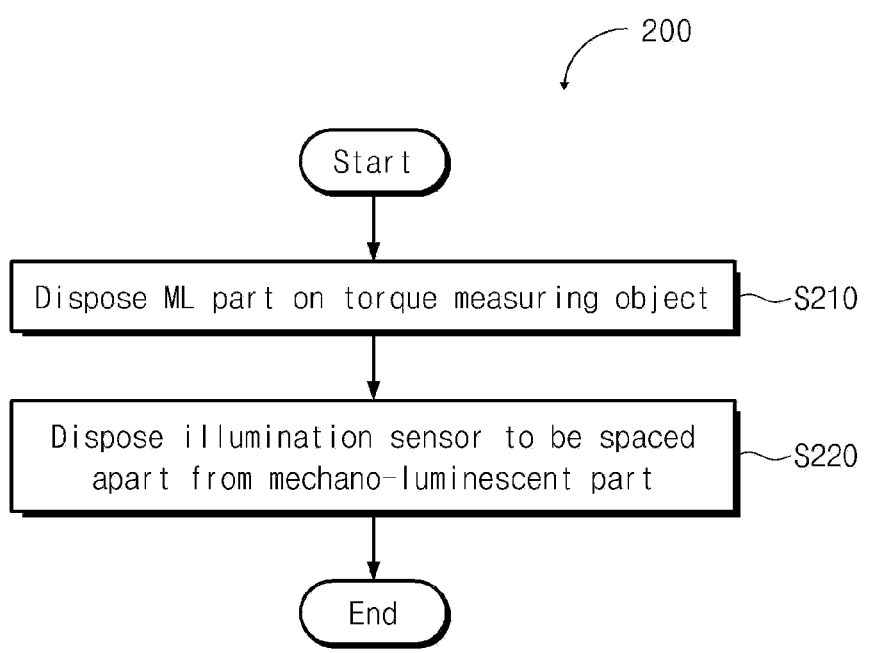
FIG. 6 is a flowchart for explaining a method for manufacturing a torque transducer according to an embodiment of the present invention.

FIG. 6 is a flowchart for explaining a method for manufacturing a torque transducer according to an embodiment of the present invention.

Referring to FIG. 6, a method 200 for manufacturing a torque transducer may include a process (S210) of disposing an ML part 110 on a torque measuring object 100 and a process (S220) of disposing an illumination sensor 120 that is spaced apart from the ML part 110.

According to an embodiment, the process (S210) of disposing the ML part 110 on the torque measuring object may include a process of applying ML paint on a circumference of a driving shaft and a process of drying the ML paint.

The process of applying the ML paint on the circumference of the driving shaft may include a process of applying the ML paint on the circumference of the driving shaft having a diameter of about 25 mm at a width of about 30 mm and a thickness of about 0.5 mm.

According to another embodiment, the process (S210) of disposing the ML part on the torque measuring object may include a process of attaching a tape having one surface that is coated with an ML material to the circumference of the driving shaft.

The process (S220) of disposing the illumination sensor may include a process of disposing the illumination sensor in a state where the illumination sensor is spaced a distance of about 2 mm from the ML part 110. However, the present invention is not limited to the spaced distance.

According to another embodiment of the present invention, a method 200 for manufacturing a torque transducer may further include a process of installing an ultraviolet radiator 130 to irradiate ultraviolet rays onto an ML part 110.

According to another embodiment of the present invention, a method 200 for manufacturing a torque transducer may further include a process of installing a blackout part 140 to block light incident into an ML part 110 and an illumination sensor 120.

For example, the process of installing the blackout part 140 may include a process of accommodating the ML part 110 and the illumination sensor 120 in a housing to seal the housing.

The torque transducer 10 according to the foregoing embodiment may be used for a transmission of a vehicle. In this case, the torque transducer 10 may be installed on the transmission shaft for transmitting a power of an engine. Also, the torque transducer 10 may be installed on a certain device and system including a shaft for transmitting a rotation force in addition to the transmission for the vehicle to measure torque.

The torque transducer for measuring torque in the non-contact manner by using the ML material that emits light when stress is applied, the method for manufacturing the torque transducer, and the transmission for the vehicle using the torque transducer are described as described above. According to the embodiments of the present invention, since the inexpensive torque transducer having a low error is realized, the torque transducer may be extensively applied to the driving system for the vehicle.

According to the embodiments of the present invention, the inexpensive torque transducer having a low error may be provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A torque transducer comprising:
   an ultraviolet radiator;
   a mechano-luminescent (ML) part disposed on a torque measuring object; and
   an illumination sensor disposed to be spaced apart from the ML part,
   wherein the ML part absorbs ultraviolet rays irradiated by the ultraviolet radiator and emits ML light reacting to torsion stress.

2. The torque transducer of claim 1, wherein the torque measuring object comprises a driving shaft.

3. The torque transducer of claim 2, wherein the ML part comprises at least one of:
   ML paint; and
   a tape coated with an ML material.

4. The torque transducer of claim 3, wherein the ML paint is applied on a circumference of the driving shaft.

5. The torque transducer of claim 4, wherein the ML paint is applied on the circumference of the driving shaft having a diameter of about 25 mm at a width of about 30 mm and a thickness of about 0.5 mm.

6. The torque transducer of claim 3, wherein the tape coated with the ML material is attached to a circumference of the driving shaft.

7. The torque transducer of claim 1, wherein the illumination sensor is spaced a distance of about 2 mm from the ML part.

8. The torque transducer of claim 1, further comprising a blackout part for blocking light incident into the ML part and the illumination sensor.

9. The torque transducer of claim 8, wherein the blackout part comprises a housing that accommodates the ML part and the illumination sensor and is sealed.

10. A method for manufacturing a torque transducer, the method comprising:
    disposing a mechano-luminescent (ML) part on a torque measuring object;
    installing an ultraviolet radiator to irradiate ultraviolet rays onto the ML part before torque is measured; and
    disposing an illumination sensor to be spaced apart from the ML part, wherein the ML part absorbs the ultraviolet rays irradiated by the ultraviolet radiator and emits ML reacting to torsion stress.

11. The method of claim 10, wherein the disposing of the ML part on the torque measuring object comprises:
   applying ML paint on a circumference of a driving shaft; and
   drying the ML paint.

12. The method of claim 11, wherein the applying of the ML paint on the circumference of the driving shaft comprises applying the ML paint on the circumference of the driving shaft having a diameter of about 25 mm at a width of about 30 mm and a thickness of about 0.5 mm.

13. The method of claim 10, wherein the disposing of the ML part on the torque measuring object comprises attaching a tape coated with an ML material on a circumference of a driving shaft.

14. The method of claim 10, wherein the disposing of the illumination sensor comprises disposing the illumination sensor to be spaced a distance of about 2 mm from the ML part.

15. The method of claim 10, further comprising installing a blackout part to block light incident into the ML part and the illumination sensor.

16. The method of claim 15, wherein the installing of the blackout part comprises accommodating the ML part and the illumination sensor in a housing and sealing the housing.

17. A transmission for a vehicle, comprising:

an ultraviolet radiator;

a transmission shaft for transmitting a power of an engine;

a mechano-luminescent (ML) part disposed on the transmission shaft; and an illumination sensor disposed to be spaced apart from the ML part, wherein the ML part absorbs ultraviolet rays irradiated by the ultraviolet radiator and emits ML reacting to torsion stress.

* * * * *